Figure 1:
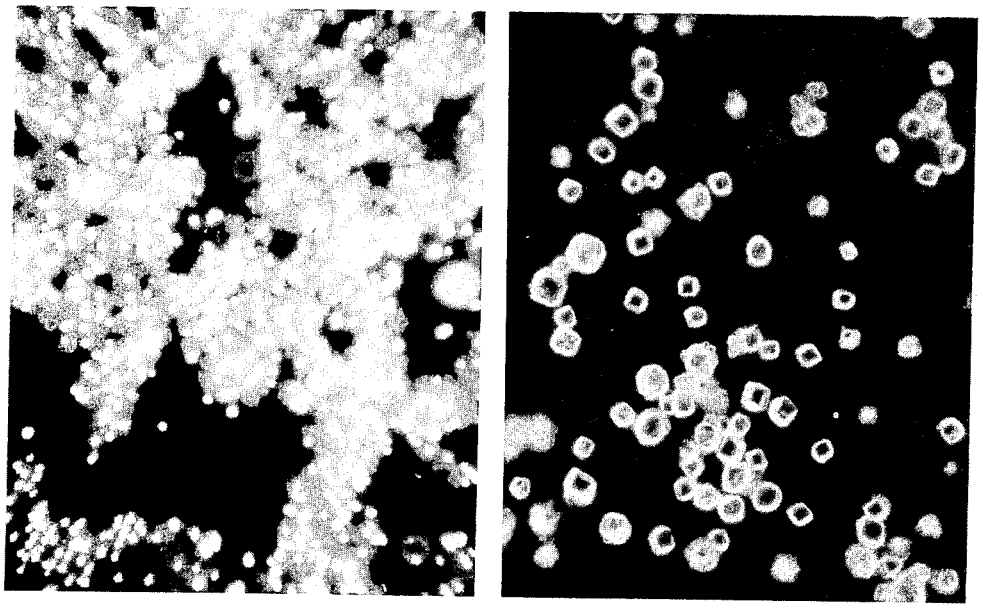
Figure 1:
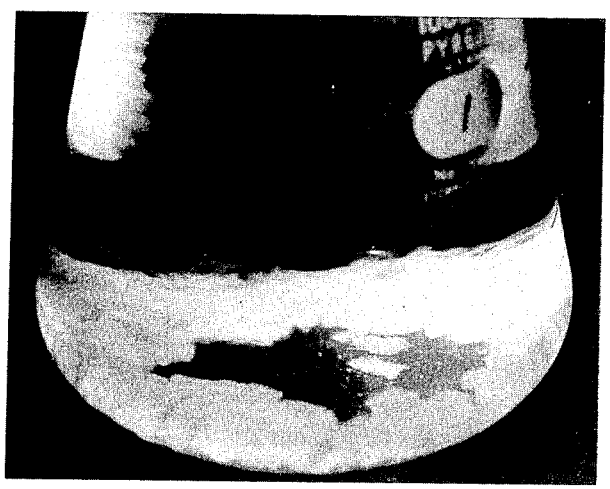

United States Patent [19]

Watsën et al.

[11] 3,948,792

[45] Apr. 6, 1976

[54] CORROSION AND SCALE SOFTENING COMPOSITION

[75] Inventors: Robert G. Watsën, LaGrange; Edwin S. Troscinski, Westmont, both of Ill.

[73] Assignee: Nalco Chemical Company, Oak Brook, Ill.

[22] Filed: Dec. 13, 1973

[21] Appl. No.: 424,254

Related U.S. Application Data

[63] Continuation-in-part of Ser. No. 233,308, March 9, 1972, abandoned, which is a continuation-in-part of Ser. No. 28,984, April 15, 1970, abandoned.

[52] U.S. Cl. ............... 252/181; 21/2.5 R; 21/2.7 R; 210/58; 210/59; 252/76; 252/87; 252/389 R
[51] Int. Cl.$^2$.. C02B 5/02; C02B 5/06; C23F 11/18; C23F 11/14
[58] Field of Search ............ 252/76, 389 R, 181, 87, 252/75; 21/2.5 R, 2.7 R; 210/58, 59

[56] References Cited
UNITED STATES PATENTS

| | | | |
|---|---|---|---|
| 2,723,956 | 11/1955 | Johnson | 252/181 |
| 2,795,560 | 6/1957 | Williams | 252/387 |
| 2,815,328 | 12/1957 | Green et al. | 252/389 R |
| 2,972,581 | 2/1961 | Johnson et al. | 252/75 |
| 3,362,910 | 1/1968 | Ordelt et al. | 252/387 |
| 3,405,072 | 10/1968 | Kinnary | 252/389 R |
| 3,645,903 | 2/1972 | Stram | 252/75 |
| 3,653,931 | 4/1972 | Borchert et al. | 252/390 |

OTHER PUBLICATIONS

Cellulose Gum (CMC), Hercules, 1951.

*Primary Examiner*—Richard D. Lovering
*Assistant Examiner*—Irwin Gluck
*Attorney, Agent, or Firm*—John G. Premo; John S. Roberts

[57] ABSTRACT

A method and composition for reducing the amount of and softening silicate scale formation in automobile and diesel coolant systems where a silicate containing anti-corrosion formula is used which comprises adding to said formula an effective amount of a polymeric dispersant which is a water-soluble carboxylic acid polymer selected from a vinyl addition polymer and a carboxymethyl cellulose. The addition of polymeric dispersants to silicate containing corrosion inhibition formula such as the boron-nitrite type ameliorates or changes the character of the crystalline precipitate to a softer amorphous type and enables the utilization of anti-corrosion formulas at dosages of from about 2,000 up to 20,000 ppm without platingout side effects. Specially preferred dispersants are maleic anhydride copolymers and carboxymethyl cellulose. The advantages of the present invention may be realized in mixed precipitates containing silicate and also anions such as carbonate, phosphate, sulfate, etc., in the presence of alkaline earth cations.

19 Claims, 11 Drawing Figures

TEST NO. 1

Precipitate
130X Magnification

Precipitate
580X Magnification

After 16 Hrs. Heating at 180°F

TEST NO. 2

Precipitate
130X Magnification

Precipitate
580X Magnification

After 16 Hrs. Heating at 180°F

TEST NO. 11

Precipitate
130X Magnification

Precipitate
580X Magnification

After 16 Hrs. Heating at 180°F

TEST NO. 12

Precipitate
130X Magnification

Precipitate
580X Magnification

After 16 Hrs. Heating at 180°F

TEST NO. A

Precipitate
130X Magnification

Precipitate
580X Magnification

After 16 Hrs. Heating at 180°F

TEST NO. A*

After 8 Days Heating at 180°F

TEST NO. B

After Heating for 7 Days at 180°F

TEST NO. B*

Precipitate
130X Magnification

After 8 Days Heating at 180°F

CORROSION AND SCALE SOFTENING COMPOSITION

This invention is a continuation-in-part of Ser. No. 233,308, filed Mar. 9, 1972 (abandoned), which in turn is a continuation of Ser. No. 28,984, filed Apr. 15, 1970 (abandoned).

The present invention is directed towards the modification or amelioration of scale formation which occurs in the presence of the silicate anion where multi-component anti-corrosion formulas are used to prevent corrosion in automotive and diesel cooling systems. In conventional anti-corrosion formulas, such as the widely used boron-nitrite type, a variety of components are utilized with silicates, such as nitrates, nitrites, mercaptobenzothiozoles, pH regulators, such as alkali metal carbonates, dyes, antifoams, etc. Such formulas are noted in the prior art as in 2,815,328 Green et al (Nalco) and also a similar U.S. Pat. No. 2,972,581 Johnson (Nalco). Separately in the area of scale reduction in locomotive boilers, there is a U.S. Pat. No. 2,723,956 Johnson (Nalco) covering the use of water-soluble maleic anhydride copolymers for preventing boiler scales. Also of interest is 2,783,200 Crum relating to polyacrylic acid as boiler scale treatment.

The present invention is also applicable to input water where precipitates other than silicate may additionally be present. such precipitates or scale may be carbonate scale, phosphate scale, etc., and where the mixed precipitate forms a scale, the addition of a water-soluble polymeric dispersant aids or assists in the amelioration of the gritty silicate portion of the mixed precipitate.

The present invention is divergent from the prior art patents in that it applies to a process for changing the texture, adherence and converting the structure to amorphous values the silicate precipitate obtained where anti-corrosion formulas embodying silicate are utilized. This is especially true where hard waters are used for calcium and magnesium values for silicate precipitates. The formation of crystalline scale due to calcium or magnesium silicate in coolant systems for automotive or diesel engines produces in time a severe probelm, diminishing normal heat transfer of the coolant to the operating machinery. The experimental results have indicated that the use of a polymeric dispersant in conjunction with a silicate containing corrosion inhibitor separately acts to alter and ameliorate the normally gritty, hard, scale-forming crystalline silicate precipitate to an amorphous type which is more easily removable and more palatable to the metal heat transfer surfaces. Of the silicate containing corrosion inhibitor, the boron-nitrite type is pre-eminently commercially utilized.

A dispersant is selected from a water-soluble carboxylic acid polymer and may be a vinyl addition polymer or carboxymethyl cellulose (CMC). Of the vinyl addition polymers contemplated, maleic anhydride copolymers as with vinyl acetate, styrene, ethylene, isobutylene, and vinyl ethers are preferred.

The utilization of the boron-nitrite silicate containing corrosion inhibitor is conventionally in the area of 2,000–20,000 ppm with an effective commercial utilization of 5,000–12,000 ppm based on the formula weight liquid.

The scale suppressant utilized according to the present invention with this formula is from about 0.1–10% of dispersant with the commercial operational percentile of about 0.1–3%. Based upon the solid formulations, the weight percent of the polymeric dispersant is commercially about 0.5–10%.

Additionally, of interest relative to prior art are the following literature references dealing with the function of polymeric dispersants generally:

Solomon and Rolfe, "Polymers that Inhibit the Deposition of Calcium Sulphate," Desalination, 1 (1966), pages 260–266.

Smith and Alexander, "The Effect of Additives on the Process of Crystallization," II, Journal of Colloid and Interface Science, Vol. 34, No. 1, September 1970, pages 81–90.

Sweett, et al, "Scale Control by Polyacrylates: The Effects of Molecular Weight and of Traces of Metals," Desalination 8 (1970), pages 167–175.

Elliot, "Scale Control by Threshold Treatment," Desalination, 8 (1970), pages 221–236.

Sexsmith et al, "The Use of Polymers for Water Treatment," Industrial Water Engineering, December 1969, pages 18–24.

ALTERATION OF SCALE BY THE POLYMERIC DISPERSANT ADDITIVE

In the accompanying Table I is set out a listing of scale suppressant studies showing contrasting values with or without the added polymeric scale suppressant. For contrasting consideration, Tests 1, 2, 10, and 13 consider styrene maleic anhydride; Tests 11 and 12 consider carboxymethyl cellulose (CMC); Tests A and B consider copolymers of acrylic acid and methyl acrylate (A) and polyacrylic acid (B).

The results indicate that where the scale suppressant was utilized, as in Test 2, a loose colloidal precipitate, amorphous in character, was formed; where no scale suppressant was utilized as in Test 1, a gritty precipitate occurred. These results were verified in Test 10 for an extremely low dosage of polymeric scale suppressant, and in 13 where no silica was present in the treated water. Additionally, Tests 12 and 11 show the alterations and formations of fluffy flock or amorphous precipitate in the case of carboxymethyl cellulose.

TABLE I

SCALE SUPPRESSANT STUDIES WITH 20 GPG TOTAL HARDNESS WATER
SCALE SUPPRESSANT ADDED AS THE PRODUCT

| Test No. | Scale Suppressant Added | Dosage As The Product | $Na_2SiO_3$ Added From A 10% Solution | Final pH |
|---|---|---|---|---|
| 1 | No scale suppressant | — | 500 ppm | 10.4 |
| 2 | Styrene Maleic Anhydride | 500 ppm from a 10% solution | 500 ppm | 10.3 |
| 10 | Styrene Maleic Anhydride MW 1600 | 100 ppm from a 1% solution | 500 ppm | 10.3 |
| 13 | Styrene Maleic Anhydride M.W. 70,000 | 500 ppm from a 10% solution | No Silica | 10.0 |
| H | Vinylacetate (hydrated) | 500 ppm from a | 500 ppm | 10.4 |

TABLE I-continued

SCALE SUPPRESSANT STUDIES WITH 20 GPG TOTAL HARDNESS WATER
SCALE SUPPRESSANT ADDED AS THE PRODUCT

| Test No. | Scale Suppressant Added | Dosage As The Product | $Na_2SiO_3$ Added From A 10% Solution | Final pH |
|---|---|---|---|---|
| | Maleic Anhydride Copolymer MW 6–9,000 | 50% solution | | |
| 1 | Ethylene Maleic Anhydride | 500 ppm from a 10% solution | 500 ppm | 10.5 |
| 11 | Carboxymethylcellulose (CMC) CT 7 LT MW 80,000 | 500 ppm | 500 ppm | 10.9 |
| 12 | Carboxymethylcellulose (CMC) 7 LT M.W. 80,000 | 500 ppm | 500 ppm | 10.9 |
| 9 | Carboxymethylcellulose (CMC) 7M MW 250,000 | 500 ppm | 500 ppm | 10.6 |
| 14 | Dowamine 70 80% Dihydroxyethylethylene Diamine MW 3,500 | 500 ppm | 500 ppm | 10.9 |
| 7 | Sodium Polyacrylate MW 8,000, 23.1% Active | 500 ppm | 500 ppm | 10.3 |
| B | Polyacrylic Acid MW 5,000–6,000 20% Active | 2,500 ppm from a 20% solution | 500 ppm | 10.6 |
| C | Hydrolized Polyacrylonitrile | 500 ppm | 500 ppm | 10.5 |
| F | Ethoxylated Acrylic Acid Polymer MW 8,000 43.5% Active | 500 ppm | 500 ppm | 10.7 |
| A | Copolymer of Acrylic Acid 23.08% and Methyl Acrylate (6.15%) MW 5,800 30% Active | 500 ppm | 500 ppm | 10.4 |
| D | Triethanole Amine Phosphate 12.7% Active | 500 ppm | 500 ppm | 10.5 |
| E | Ethoxylated Glycerine reacted with $P_2O_5$ 13.3% Active | 500 ppm | 500 ppm | 10.6 |
| 6 | Dequest 2000 Nitrilotrimethylene Phosphonic Acid 50% Active | *500 ppm | 500 ppm | 10.3 |
| G | Dequest 2010 1-hydroxyethylidine 1-diphosphonic acid 60% Active | *500 ppm | 500 ppm | 10.4 |
| 8 | Dequest TKD-2 Potassium Salt of Hexamethylenediamine Tetramethylene Phosphonic Acid 36.3% Active | 500 ppm | 500 ppm | 10.2 |
| 8a | Same As Above | *500 ppm plus 500 ppm Borax | 500 ppm | 10.2 |
| 5 | Gluconic Acid | 500 ppm from a 50% solution | 500 ppm | 10.4 |
| 3 | EDTA (acid) | *500 ppm | 500 ppm | 10.5 |
| 3a | EDTA (acid) | *500 ppm plus 500 ppm Borax | 500 ppm | 10.4 |
| 4 | Sodium Citrate | 500 ppm | 500 ppm | 10.2 |

| Test No. | OBSERVATION OF TEST SOLUTION AND PRECIPITATE AT AMBIENT TEMPERATURES AND AFTER 16 HOURS AT 180°F |
|---|---|
| 1 | Large flocculant precipitate forming within 2 to 3 minutes. After heating overnight the ppt becomes more gritty, larger and denser flock. |
| 2 | Solution becomes cloudy after SMA addition and colloidal in appearance after the silica addition, some ppt is formed within 4 hours. However, upon heating overnight, a fine, loose ppt is formed, while the solution remains cloudy. |
| 10 | Initially cloudy solution forms a dense, fine partially adhering precipitate upon heating overnight. |
| 13 | Initially cloudy solution becomes clear with a very fluffy ppt upon heating. |
| H | Solution is very cloudy after mixing. It becomes clear with very loose fluffy ppt after heating overnight. |
| I | Solution is very cloudy after mixing. It becomes hazy with large non-adherent floc. |
| 11 | Solution becomes very hazy after the silica addition. Some ppt settles out after mixing, most of the ppt stays colloidal. Loose, non-adherent ppt forms after heating overnight, solution remains hazy. |

TABLE I-continued

| Test No. | OBSERVATION OF TEST SOLUTION AND PRECIPITATE AT AMBIENT TEMPERATURES AND AFTER 16 HOURS AT 180°F |
|---|---|
| 12 | Cloudy, a very hazy solution forms after the silica addition. Most of the ppt stays in colloidal form. Light, flocculant ppt forms after heating overnight. |
| 9 | Slowly dissolving material. Solution becomes cloudy after silica addition. After heating overnight some fine, non-adherent ppt is formed. Solution remains cloudy. |
| 14 | Very fluffy floc forms soon after mixing. Precipitate settles down within 5 min. A very light, fluffy ppt is formed after heating. |
| 7 | Initially cloudy solution forms a dense, fine partially adhering precipitate upon heating overnight. |
| B | No precipitate in the initial solution and no precipitate after heating. A small amount of a very lumpy precipitate is formed after heating for 7 days at 180°F. |
| C | The solution is cloudy after mixing. It becomes clear with a very loose fluffy ppt after heating overnight. |
| F | A clear solution after mixing at room temperature. It becomes hazy with crystalline type ppt. adherent to the flask after heating overnight. |
| A | The solution becomes slightly cloudy after the silica addition. It becomes cloudy with small amounts of partially adhering precipitate after heating overnight. |
| D | The solution is cloudy after mixing. It becomes clear with a very loose fluffy ppt after heating overnight. |
| E | The solution is slightly cloudy after mixing. It becomes clear with large flocculant ppt, somewhat gritty in appearance after heating. |
| 6 | Clear solution with no ppt after heating for 7 days. |
| G | Solution remains clear after heating for 7 days. |
| 8 | A cloudy solution becomes clear upon heating with very light fluffy precipitate. |
| 8a | Initially cloudy solution becomes clear with fluffy precipitate, more dense than in 8. |
| 5 | Initially cloudy solution. Small flock, non adherent precipitate is formed after overnight heating. |
| 3 | Clear solution, remains clear after heating overnight. |
| 3a | Initially clear solution forms a loose, fine precipitate upon heating overnight. |
| 4 | Initially clear solution becomes cloudy upon heating. Dense, crystaline type ppt is formed after heating overnight. |

*Note: Caustic was added to adjust pH.

Figure 2:
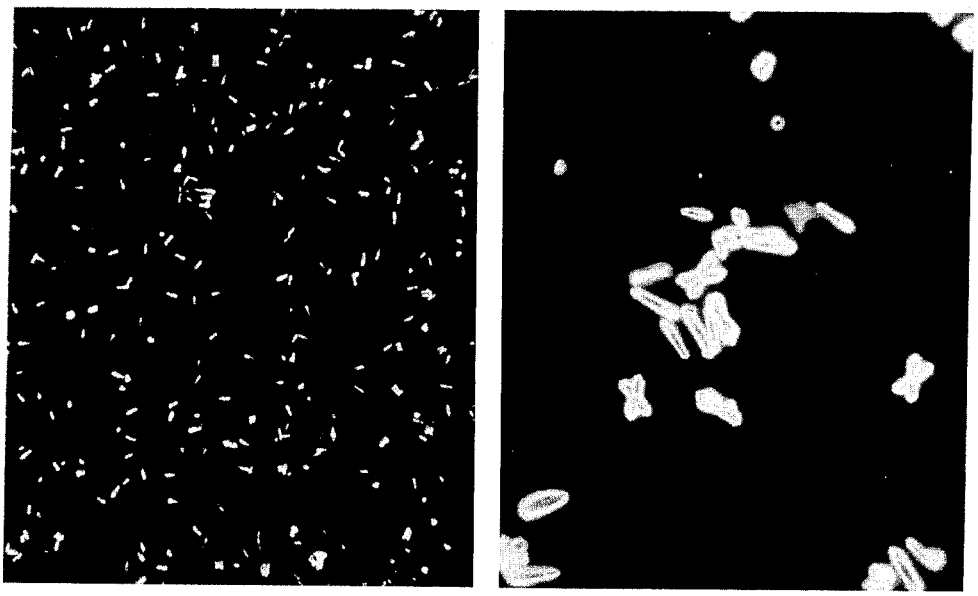
Figure 2:
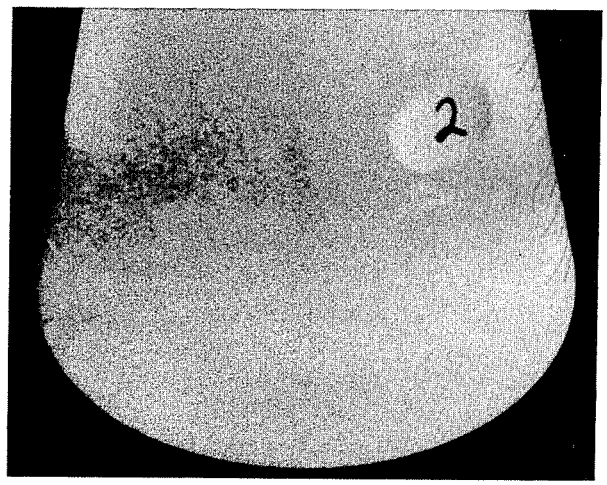
Figure 3:
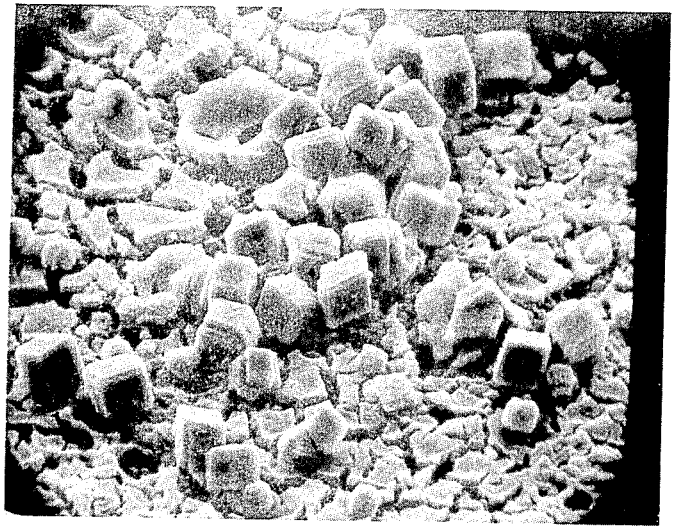
Figure 3:
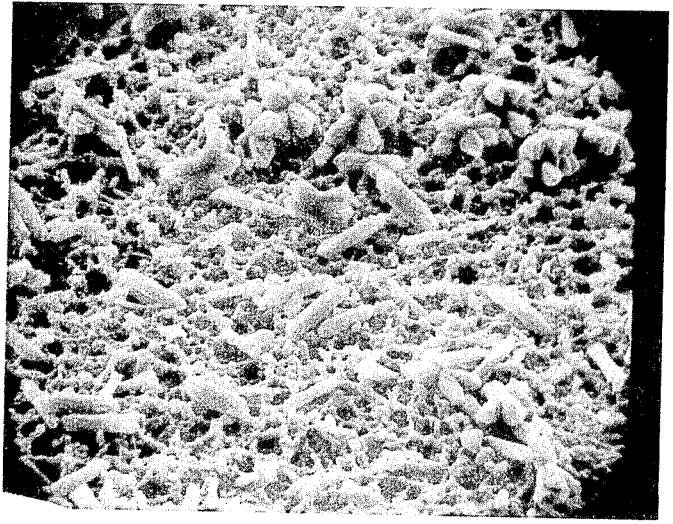
Figure 4:
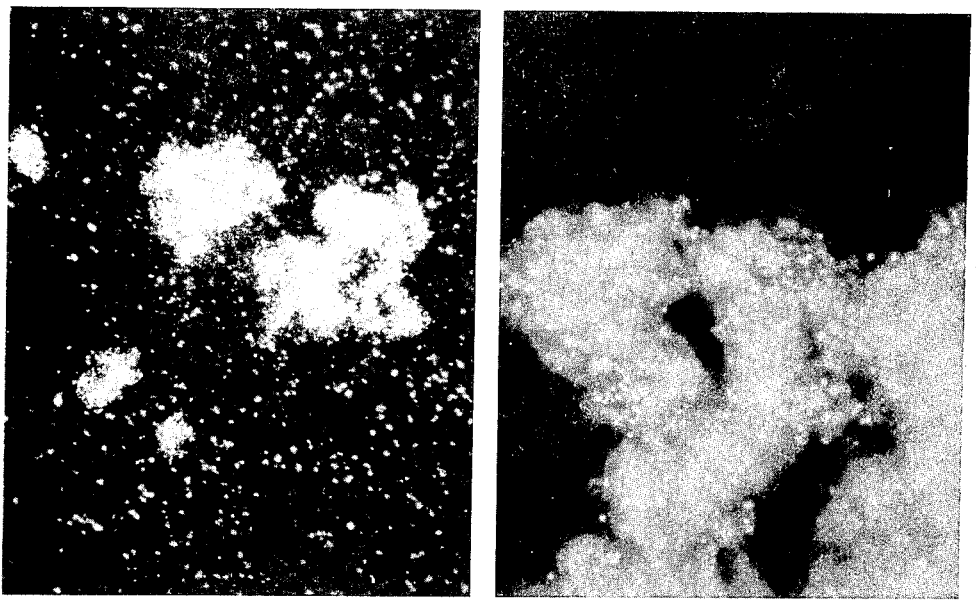
Figure 4:
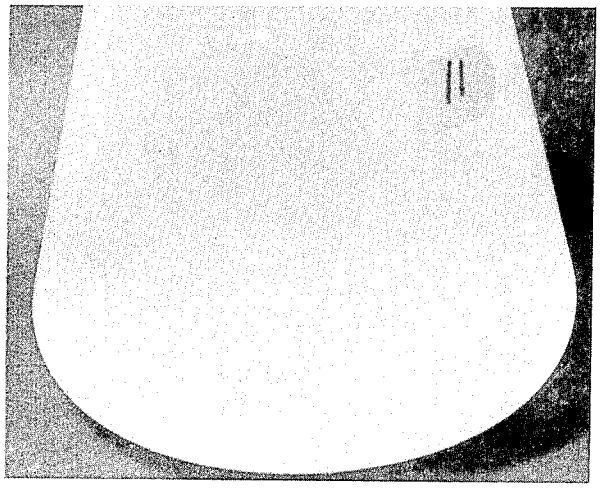
Figure 5:
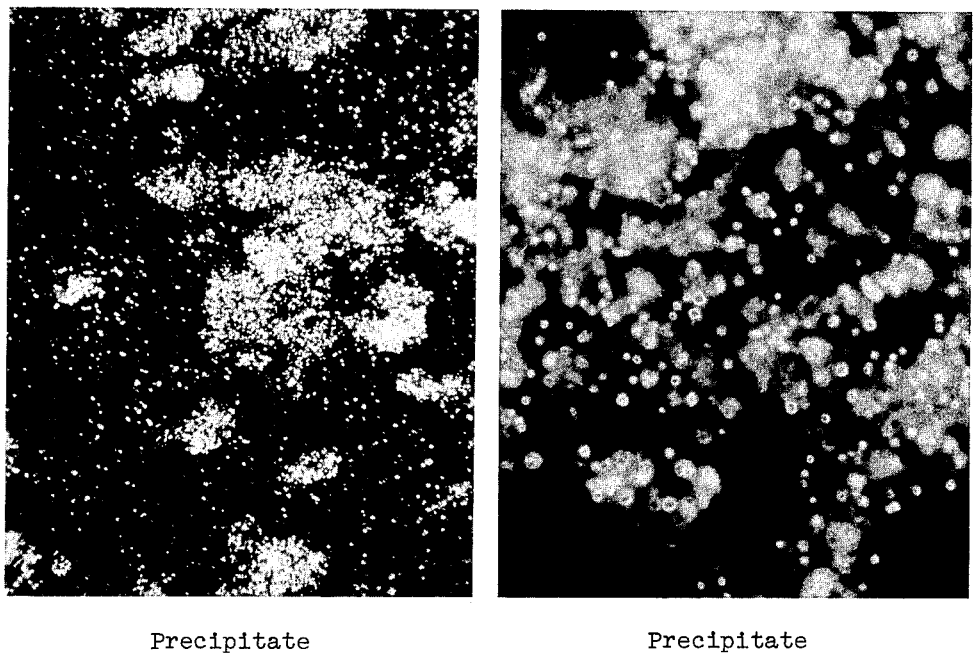
Figure 5:
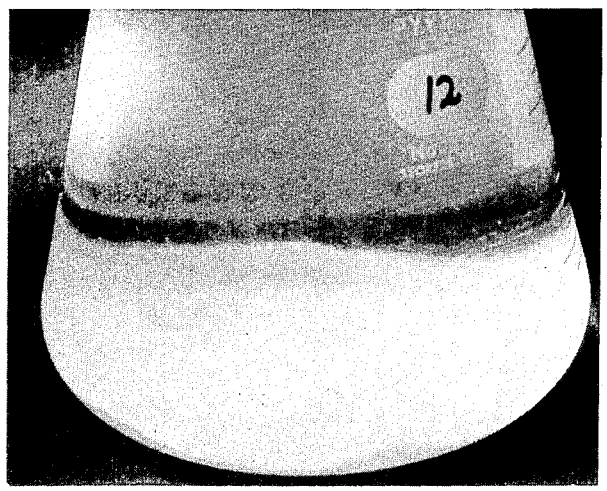
Figure 6:
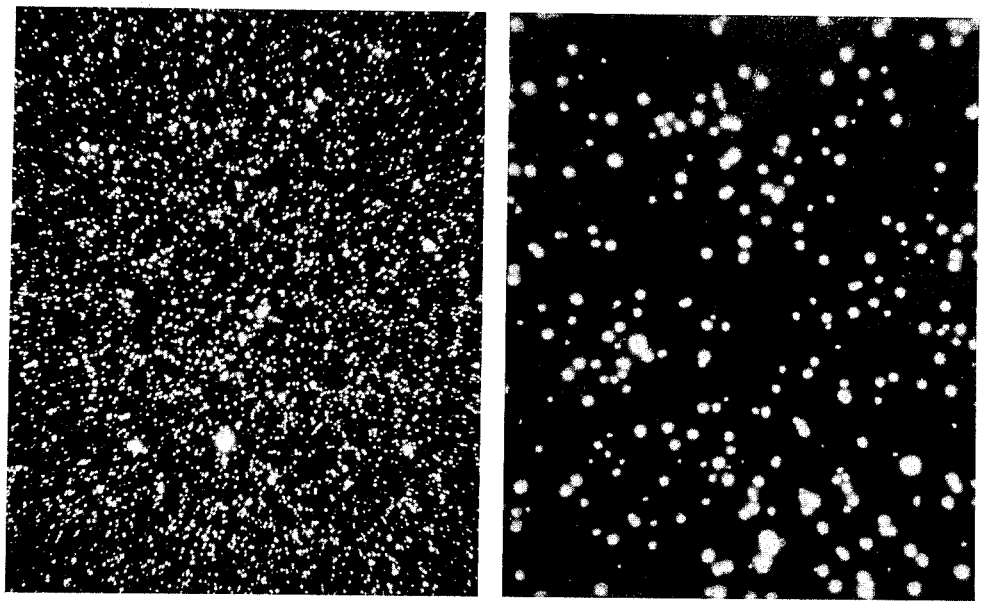
Figure 6:
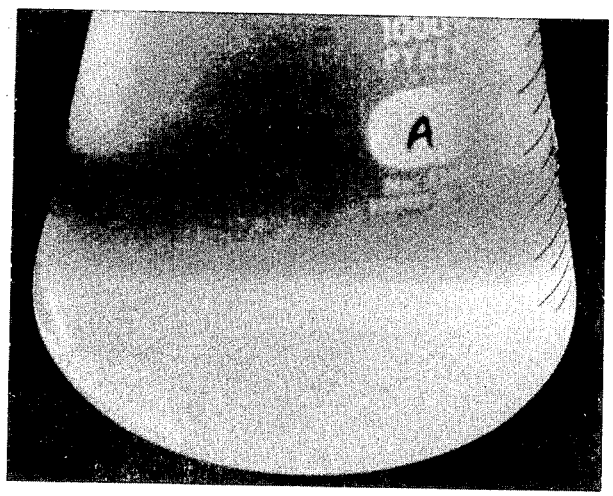
Figure 7:
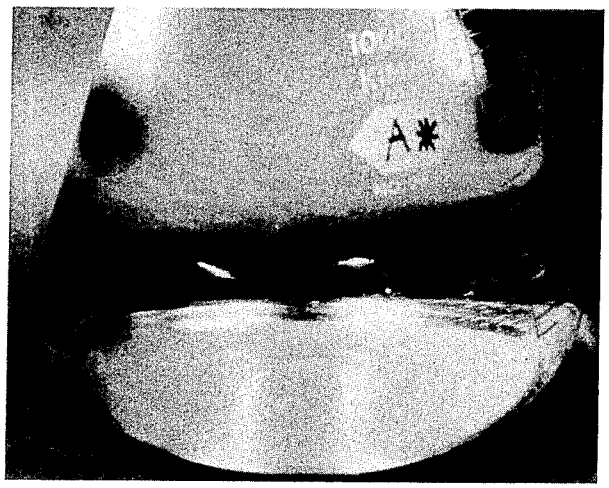
Figure 8:
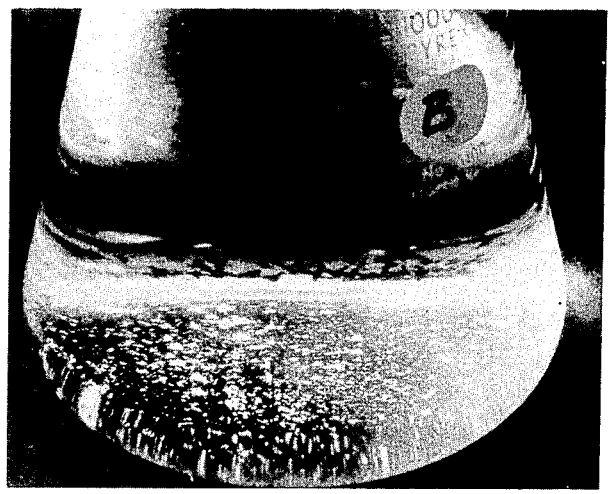
Figure 9:
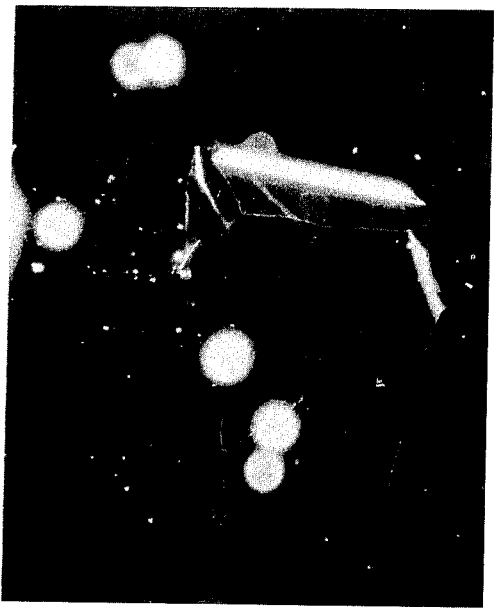
Figure 9:
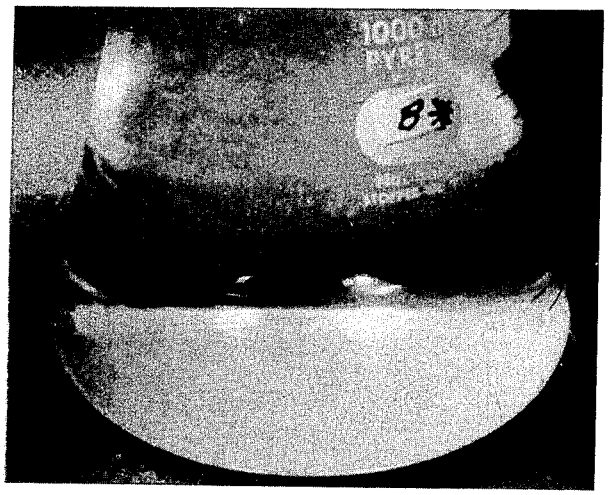

The results can also be visually observed by reference to corresponding FIG. 1, Test 1; FIG. 2, Test 2; FIG. 3, Tests 1 and 2 blow up; FIG. 4, Test 11; FIG. 5, Test 12; FIG. 6, Test A; FIG. 7, Test A*; FIG. 8, Test B; FIG. 9, Test B*.

Additionally, in the area of the alteration or change brought about from a crystalline precipitate to an amorphous fluffy one due to addition of a polymeric scale suppressant, tests were made utilizing 20 gpg water and 500 ppm of sodium silicate to which in one case was added 500 ppm of styrene maleic anhydride. X-ray diffraction measurements showed that where scale suppressants were added, there was a change from crystalline to amorphous condition of the precipitate; see further Example I.

Figure 10:
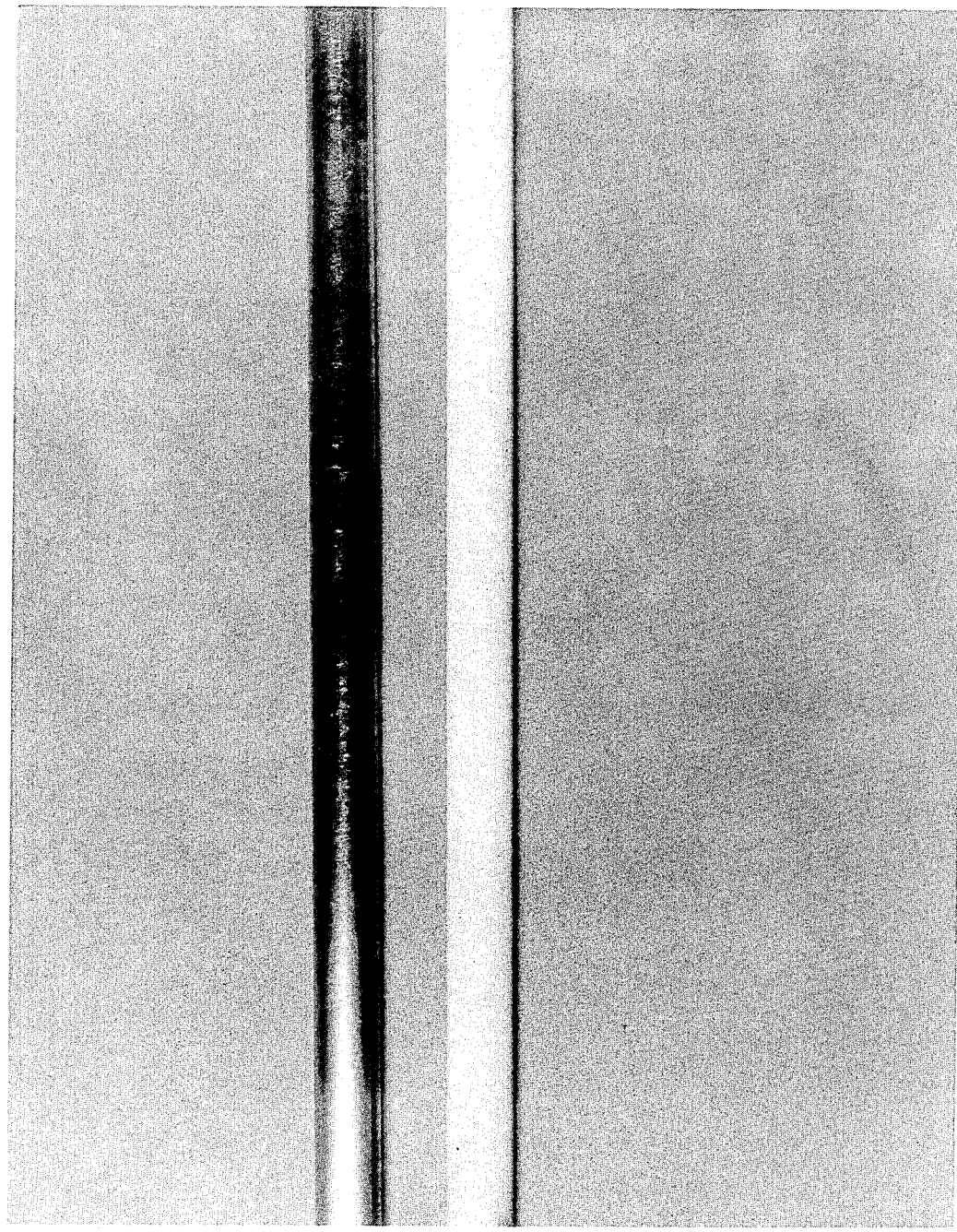

In addition to the advantages of the change of character of the scale-forming precipitate allowing its removal and non-adherence to the metal surfaces of the heat transfer unit, it was found that the same scale suppressant assisted in the prevention of pit corrosion, and this is illustrated with reference to FIG. 10 and Example II. FIG. 10 shows a side-by-side comparison of a coated tube and a clean tube (coated tube is white, clean tube is black) where the clean tube was subjected to treatment with a boron-nitrite corrosion inhibitor to which a polymeric scale suppressant had been added. Contrastingly, the black tube had no silicate scale formed on it. From visual inspection, the pitted area noted specially near the center of the picture, graphically illustrates pit corrosion problems which can be alleviated by utilization of the present scale suppressant.

Superiority Over Alternative Additives, Chelates or Chelants

With reference to Table I, it is noted that certain tests, as, for example, 3 and 4, deal with nitrogen-type chelating compounds and a clear solution is formed. However, it has been found that the corrosion rate with chelants as to copper, solder, brass, etc., is beyond commercial tolerance and comparative evidence is shown further in Example III.

Figure 11:
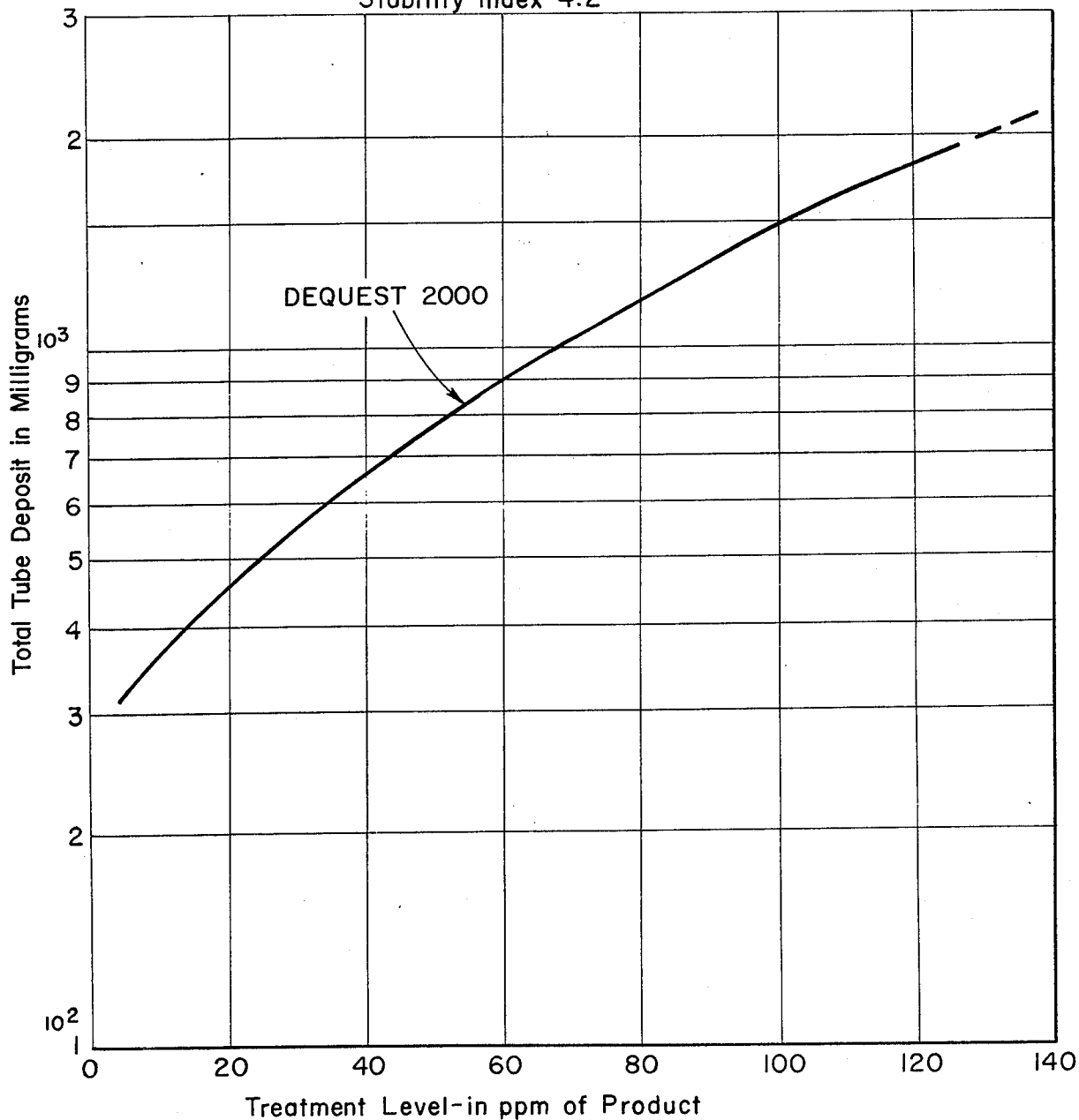

Also, again with reference to FIG. 1, it is noted that phosphonic acid-type chelates such as Dequest 2000 gave a clear solution. However, in the case of phosphonic acid chelants, it has been found that the addition of Dequest type compounds resulted in self-plating at increased dosages; see further FIG. 11.

Definition

In the present specification and claims the term borate-nitrite corrosion inhibitor is equivalent to and interchangeable with boron-nitrite corrosion inhibitor and the meaning is the same, referring to multicomponent formulas embracing a source of boron such as borax, an alkali metal nitrite, and a silicate. Many formulas have additional components such as pH regulators, dyes, antifoams, etc.

The Preferred Borate-Nitrite Corrosion Inhibitor

The borate-nitrite type compositions are useful silicate containing formulas for corrosion protection in closed recirculating cooling systems such as radiator types and commercial air conditioners. These borate-nitrite inhibitor formulas contain as one of their components at least 1% by weight of a water-soluble silicate such as for instance sodium metasilicate. Such formulas may contain as much as 50% by weight of such water-soluble silicates.

The water-soluble silicates are used in these formulas to provide alkaline buffering and to provide corrosion protection to iron and other ferrous and non-ferrous metals. While the water-soluble silicates provide pH control and corrosion inhibition, their presence in the borate-nitrite formulas render them susceptible to the formation of silicate scale which can form tenacious coatings on the heat transfer surfaces of automotive and diesel cooling systems.

It is foreseen that the use of silicate salts in formulations used to inhibit corrosion in automotive and diesel cooling systems will increase as environmental laws tend to limit the use and disposal of borate containing compounds.

As the amount of water-soluble silicates is increased in corrosion inhibiting formulas, the danger of silicate scale forming on the heat transfer surfaces also increases.

Additionally, as the use of pollution prevention devices proliferate in automotive and diesel engines, it has become necessary to operate these engines at more elevated temperatures, thus increasing the temperature of the aqueous coolants which circulate in these cooling systems. This increase in coolant temperature also adds to the problem of silicate scale formation. As a corollary to this phenomena, it should be noted that as the operating temperature of these systems is increased, it is essential that all heat transfer surfaces be free of scale and corrosion products to allow maximum efficiency to be maintained. If scales such as silicate scales are allowed to form on the heat transfer surfaces, there is a danger of overheating occurring, which, in aggravated cases, can cause piston seizure with resultant engine failure. This borate-nitrite composition can be applied to systems where ethylene glycol is used as an antifreeze. The buffered formulation neutralizes the acid from the glycol oxidation. An unbuffered product is not suitable for use in water-glycol systems but could be used in straight water systems.

These products give corrosion protection in systems that have metals coupled galvanically; for example, copper, brass, solder, iron, and aluminum. This product also reduces the precipitation of hardness salts in unsoftened waters. Precipitated hardness salts are not as adherent to a heat transfer surface as with a similar treatment not containing a dispersant.

Because it performs well in hard water, the new inhibitor can provide major water preparation savings. When softening is avoided, heavy capital investments for equipment are eliminated as are the operating manpower and regenerant chemical costs. Use of the new inhibitor without pre-softening also does away with the pollution load created by the brine regenerant and rinsing solutions used with zeolite softeners.

The corrosion and scale inhibitor composition comprises, by weight:

A. from 50 to 99.9% of a borate-nitrite corrosion inhibitor; and
B. from 0.1 to 50% of a dispersant.

The borate-nitrite corrosion inhibitor can be in either the liquid or solid form. The percentages of the various ingredients vary dependent on the form. For example, if a liquid is used, the borate-nitrite corrosion inhibitor comprises, by weight:

A. from 40 to 90% water
B. from 2 to 20% of an alkali metal silicate calculated as sodium metasilicate pentahydrate
C. from 0 to 15% of an alkali metal nitrite calculated as sodium nitrite
D. from 0 to 15% of an alkali metal nitrate calculated as sodium nitrate
E. from 0 to 5% of a compound selected from the group consisting of mercaptobenzothiazole and alkali metal salts thereof
F. from 3 to 60% of a compound selected from the group consisting of boric acid and alkali metal borates, the latter being calculated as the tetraborate pentahydrate
G. an amount of a base selected from the group consisting of the alkali metal hydroxides, carbonates, and bicarbonates sufficient to provide a pH of about 8.5 to 10.5 in an aqueous solution of said composition. Usually, about 0.1 to 5% sodium hydroxide is used to adjust the pH.

Preferably, this composition comprises, by weight:

A. from 50 to 80% water
B. from 1 to 20% of an alkali metal silicate calculated as sodium metasilicate pentahydrate
C. from 4 to 12% of an alkali metal nitrite calculated as sodium nitrite
D. from 4 to 12% of an alkali metal nitrate calculated as sodium nitrate
E. from 0.5 to 3.0% of a compound selected from the group consisting of mercaptobenzothiazole and alkali metal salts thereof
F. from 5 to 25% of a compound selected from the group consisting of boric acid and alkali metal borates, the latter being calculated as the tetraborate pentahydrate.

Even more preferably, the borate-nitrite corrosion inhibitor comprises, by weight:

A. from 70–80% water
B. from 2 to 4% of an alkali metal silicate calculated as sodium metasilicate pentahydrate
C. from 5 to 10% of an alkali metal nitrite calculated as sodium nitrite
D. from 5 to 7% of an alkali metal nitrate calculated as sodium nitrate
E. from 0.8 to 1.5% of a compound selected from the group consisting of mercaptobenzothiazole and alkali metal salts thereof
F. from 8 to 15% of a compound selected from the group consisting of boric acid and alkali metal borates, the latter being calculated as the tetraborate pentahydrate.

The percentages of the various ingredients for the solid are different from those of the liquid. For example, if a solid product is used, the borate-nitrite corrosion inhibitor comprises, by weight:

A. from 2 to 15% of an alkali metal silicate calculated as sodium metasilicate pentahydrate
B. from 0 to 30% of an alkali metal nitrite calculated as sodium nitrite C. from 0 to 30% of an alkali metal nitrate calculated as sodium nitrate
D. from 0 to 10% of a compound selected from the group consisting of mercaptobenzothiazole and alkali metal salts thereof
E. from 15–99% of a compound selected from the group consisting of boric acid and alkali metal borates, the latter being calculated as the tetraborate pentahydrate.

Preferably this composition comprises, by weight:
A. from 5 to 15% of an alkali metal silicate calculated as sodium metasilicate pentahydrate
B. from 10 to 25% of an alkali metal nitrite calculated as sodium nitrite
C. from 10 to 25% of an alkali metal nitrate calculated as sodium nitrate
D. from 2 to 7% of a compound selected from the group consisting of mercaptobenzothiazole and alkali metal salts thereof
E. from 40 to 80% of a compound selected from the group consisting of boric acid and alkali metal borates, the latter being calculated as the tetraborate pentahydrate.

Even more preferably, the borate-nitrite corrosion inhibitor comprises, by weight:
A. from 5 to 10% of an alkali metal silicate calculated as sodium metasilicate pentahydrate
B. from 12 to 20% of an alkali metal nitrite calculated as sodium nitrite
C. from 15 to 20% of an alkali metal nitrate calculated as sodium nitrate
D. from 2 to 5% of a compound selected from the group consisting of mercaptobenzothiazole and alkali metal salts thereof
E. from 50 to 70% of a compound selected from the group consisting of boric acid and alkali metal borates, the latter being calculated as the tetraborate pentahydrate.

In most cases, at least 5% of the formulation should be made up of either alkali metal nitrite, alkali metal nitrate or a combination of the two. Usually, there will also be at least 0.5% of mercaptobenzothiazole or alkali metal salts thereof in the formulation.

Two examples of these compositions are given below. The liquid borate-nitrite corrosion inhibitor could comprise by weight:

Formula A

A. 75.6% water
B. 2.0% sodium hydroxide
C. 2.5% sodium metasilicate
D. 5.0% sodium nitrite
E. 5.0% sodium nitrate
F. 8.9% sodium tetraborate
G. 1.0% mercaptobenzothiazole The solid borate-nitrite corrosion inhibitor could comprise, by weight:

Formula B

A. 7.3% sodium metasilicate
B. 14.4% sodium nitrite
C. 17.3% sodium nitrate
D. 4.7% sodium tetraborate
E. 2.8% mercaptobenzothiazole
F. 53.5% sodium metaborate This type of formulation is compatible with ethylene glycol and is equally applicable to systems with and without antifreeze.

In addition to the ingredients listed in the above formulations, minor amounts of antifoams, dyes, and a sulfite, such as sodium sulfite, can be added. Usually about 0.1 to 5.0% of sodium sulfite is added. The sodium sulfite prevents the oxidation of the mercaptobenzothiazole to the disulfide. Preferably sodium hydroxide is used as the base and ranges from 0.5 to 4.0% by weight.

The Dispersants

Suitable dispersants are maleic anhydride polymers. These polymers include the homopolymerization of maleic anhydride, acrylonitrile and acrylic acid. Copolymers of maleic anhydride are also useful, for example, copolymers with styrene, ethylene, or vinyl acetate.

As previously stated, maleic anhydride polymers are preferred. Especially useful maleic anhydride polymers are selected from the group consisting of homopolymers of maleic anhydride, and copolymers of maleic anhydride with vinyl acetate, styrene, ethylene, isobutylene and vinyl ethers. These polymers can be easily prepared according to standard methods of polymerization.

All of the above-described polymers are water-soluble or at least colloidally dispersible in water. The molecular weight of these polymers may vary over a broad range although it is preferred to use polymers having average molecular weights ranging between 1,000 up to 1,000,000. In a most preferred embodiment of the invention these polymers have a molecular weight of 100,000 or less. While higher molecular weight polymers may be used, there is no particular advantage in their utilization because they tend to be broken down due to the shear forces found in recirculating cooling systems. Also, when used in larger amounts in concentrated formulas, they produce highly viscous products that are difficult to use.

The water-soluble polymers of the type described above are often in the form of copolymers which are contemplated as being useful in the practice of this invention provided they contain at least 10% by weight of

groups where M is hydrogen, alkali metal, ammonium or other water-solubilizing radicals. The polymers or copolymers may be prepared by either addition or hydrolytic techniques. Thus, maleic anhydride copolymers are prepared by the addition polymerization of maleic anhydride and another comonomer such as styrene. The low molecular weight acrylic acid polymers may be prepared by addition polymerization of acrylic acid or its salts either with itself or other vinyl comonomers. Alternatively, such polymers may be prepared by the alkaline hydrolysis of low molecular weight acrylonitrile homopolymers or copolymers. For such a preparative technique see Newman U.S. Pat. No. 3,419,502.

In the case of carboxymethyl cellulose, cellulose is modified with chloroacetic acid to graft carboxylic acid moieties onto the cellulose backbone.

Two standard formulations of the subject matter of this invention are listed below.

| Designation | D-9 | D-11 | D-2* |
|---|---|---|---|
| Water | — | 75.1% | 75.6% |
| Sodium hydroxide | — | 2.0 | 2.0 |
| Sodium metasilicate | 7.3% | 2.5 | 2.5 |
| Sodium nitrite | 14.4 | 5.0 | 5.0 |
| Sodium nitrate | 17.3 | 5.0 | 5.0 |
| Sodium tetraborate | 4.7 | 8.9 | 8.9 |
| Mercaptobenzothiazole | 2.8 | 1.0 | 1.0 |
| Sodium metaborate | 49.5 | — | — |
| Sodium salt of styrene maleic anhydride polymer | 4.0 | 0.5 | — |

*D-2 is a standard borate-nitrite corrosion inhibitor without the addition of a dispersant.

EXAMPLE I

Scale Suppressant Studies Utilizing X-Ray Diffraction Data

Contrasting test samples were made using as follows:

| Test No. 1 | 500 ppm | $Na_2SiO_3$ |
|---|---|---|
| Test No. 2 | 500 ppm | $Na_2SiO_3$ |
|  | 500 ppm | SMA |

X-ray analysis of precipitate:

|  | Test No. 1 | Test No. 2 |
|---|---|---|
| Ca | 50.29 | 68.67 |
| Na | 1.25 | 5.49 |
| P | 1.03 | 1.04 |
| Si | 28.74 | 8.32 |
| NaCl | 3.29 | 14.83 |
| $Na_2SO_4$ | — | 1.64 |
| Al | 1.03 | — |
| Mg | 14.37 | — |

In Test No. 2 no silicates appeared by diffraction analysis. The explanation arrived at was that the product was in amorphous form rather than crystalline.

EXAMPLE II

Scale Recirculating Tests

Recirculating test unit was operated in 4 cycles of each 7 days at 2 linear feet/second past the heat transfer tube (30,000 BTU heat transfer), plus one day of operation at 12 linear feet per second. At this point the water was drained and refilled this cycle was repeated three times.

Operating parameters:
1. 20 gpg hardness water
2. 4 fl. oz. of boron-nitrite silicate corrosion inhibitor with and without maleic anhydride suppressant per gallon of water.

Recirculating temperature, 180°F
Heat transfer rate 30,000 BTU/ft/hr

This test was designed to duplicate conditions of heat inside an engine and a thermostat heat probe (50,000 BTU) was placed inside each tube. Test was run for 7 days at the idling speed of a truck (liquid at 2 linear feet per second); on the eighth day the relative velocity of liquid was increased to simulate an operating speed at 50 mph, 12 linear ft/sec and fresh coolant and make up was utilized every 8 days through four cycles for a 32-day total. The results show the deposition or scale formation of silicate scale (white) on the one tube as contrasted with freedom from scale on the tube treated with scale suppressant. Additionally, on the white tube near the center (see also FIG. 10) shows pit corrosion in areas where the black tube is clean. There is pinpoint corrosion on the white tube which becomes highly anodic.

EXAMPLE III

Increased Corrosion Rate with Chelants

The following tests illustrated the addition of a 6% EDTA solution to a conventional borate-nitrite silicate corrosion inhibitor. The results indicate that the utilization of chelants such as EDTA is deleterious especially to solder, brass, and aluminum metals.

The most important concept of the invention resides in the transformation of water-insoluble silicate scale-forming compounds into soft substantially non-crystalline masses which are non-adherent to heat transfer surfaces of automotive and diesel cooling systems. While the water-soluble polymers initially suppress the formation of silicate scale-forming compounds, they do not hold these compounds in solution. This phenomena is to be distinguished from true chelation which prevents scale-forming compounds to pecipitate from solution. Thus, the water-soluble polymers act to vary the crystal characteristics of silicate scale-forming compounds and also to keep these thus modified compounds in a state of suspension.

Corrosion Tests with Nitrogen Chelates

| | | Corrosion Rates in MPY* | | | | |
|---|---|---|---|---|---|---|
| Dosage** | Test Water | Cu | Solder | Brass | Cast Iron | Aluminum |
| 2 oz/gal | Soft water | 0.6 | 32.0 | 0.4 | 0.2 | 0.1 |
| 1 oz/gal | Soft water | 0.7 | 8.7 | 0.4 | 0.4 | 1.5 |
| 2 oz/gal | 20 gpg $H_2O$ | 1.2 | 7.6 | 0.8 | 0.5 | 6.0 |
| 1 oz/gal | 20 gpg $H_2O$ | 1.6 | 3.6 | 0.3 | 0.5 | 37.4 |

*mils per year
**Formula A (ante) utilized + 6% added EDTA

Recirculating Test

| | | Corrosion Rates in MPY* | | | | |
|---|---|---|---|---|---|---|
| Dosage** | Test Water | Cu | Solder | Brass | Cast Iron | Aluminum |
| 2 oz/gal | Soft water | 1.4 | 69.0 | 0.4 | 0.0 | 2.1 |
| 1 oz/gal | Soft water | 0.9 | 44.3 | 0.6 | 0.2 | 21.7 |
| 4 oz/gal | Soft water | 0.0 | 109.0 | 0.1 | 9.0 | 0.6 |
| 2 oz/gal | 20 gpg $H_2O$ | 0.7 | 4.3 | 0.7 | 0.0 | 25.1 |
| 1 oz/gal | 20 gpg $H_2O$ | 0.8 | 3.5 | 0.7 | 0.1 | 53.7 |

*mils per year
**Formula A (ante) utilized + 6% added EDTA

Aluminum in Neat

| Boron-nitrite corrosion inhibitor | 0.8 MPY |
|---|---|
| 6% EDTA added to above | 7.6 MPY |

Formula B + 10% Added Borax

| | Corrosion Rates in MPY* | | | | |
|---|---|---|---|---|---|
| Dosage | Cu | Solder | Brass | Iron | Aluminum |
| ¼ | 0.3 | 0.5 | 0.1 | 1.0 | 4.1 |
| ½ | 0.2 | 0.3 | 0.1 | 0.5 | 3.5 |
| ¾ | 0.2 | 0.4 | 0.1 | 0.2 | 3.1 |
| Standard | 0.2 | 0.2 | 0.1 | 0.1 | 0.3 |
| Double | 0.2 | 0.2 | 0.1 | 0.1 | 0.5 |

*mils per year

We claim:
1. A corrosion and scale inhibitor composition for automobile and diesel coolant systems comprising an aqueous solution containing the following:

I.
   A. from 40 to 90% water
   B. from 2 to 20% of an alkali metal silicate calculated as sodium metasilicate pentahydrate
   C. from 0 to 15% of an alkali metal nitrite calculated as sodium nitrite
   D. from 0 to 15% of an alkali metal nitrate calculated as sodium nitrate
   E. from 0 to 5% of a compound selected from the group consisting of mercaptobenzothiazole and alkali metal salts thereof
   F. from 3 to 60% of a compound selected from the group consisting of boric acid and alkali metal borates, the latter being calculated as the tetraborate pentahydrate
   G. an amount of a base selected from the group consisting of the alkali metal hydroxides, carbonates, and bicarbonates sufficient to provide a pH of about 8.5 to 10.5 in an aqueous solution of said composition.

II. from 0.1 to 50% by weight, based on the weight of the solids present in I, of a polymeric dispersant which is a water-soluble carboxylic acid polymer selected from at least one member selected from the group consisting of a carboxylic acid containing vinyl addition polymer and carboxymethyl cellulose.

2. The composition according to claim 1 wherein the polymeric dispersant is a maleic anhydride copolymer.

3. The composition according to claim 1 wherein the polymeric dispersant is carboxymethyl cellulose.

4. The composition according to claim 1 wherein the anti-corrosion formula is utilized in the coolant systems in an amount of from about 2,000–20,000 ppm and the polymeric dispersant is utilized in an amount of from 0.1–10 weight percent of the formula.

5. The composition according to claim 1 wherein the anti-corrosion formula is utilized in the coolant systems in an amount of from about 5,000–12,000 ppm and the polymeric dispersant is utilized in an amount of from 0.1–10 weight percent of the formula.

6. The composition of claim 1 wherein the average molecular weight of the water-soluble carboxylic acid polymer is within the range of between 1,000 and 1,000,000.

7. The composition of claim 1 wherein the average molecular weight of the water-soluble carboxylic acid polymer is within the range of between 1,000 and 100,000.

8. A corrosion and scale inhibitor composition for automobile and diesel coolant systems comprising an aqueous solution containing the following:

I.
   A. from 50 to 80% water
   B. from 1 to 20% of an alkali metal silicate calculated as sodium metasilicate pentahydrate
   C. from 4 to 12% of an alkali metal nitrite calculated as sodium nitrite
   D. from 4 to 12% of an alkali metal nitrate calculated as sodium nitrate
   E. from 0.5 to 3.0% of a compound selected from the group consisting of mercaptobenzothiazole and alkali metal salts thereof
   F. from 5 to 25% of a compound selected from the group consisting of boric acid and alkali metal borates, the latter being calculated as the tetraborate pentahydrate;

II. from 0.1 to 50% by weight, based on the weight of the solids present in I, of a polymeric dispersant which is a water-soluble carboxylic acid polymer selected from at least one member selected from the group consisting of a carboxylic acid containing vinyl addition polymer and carboxymethyl cellulose.

9. A corrosion and scale inhibitor composition for automobile and diesel coolant systems comprising an aqueous solution containing the following:

I.
   A. from 70–80% water
   B. from 2 to 4% of an alkali metal silicate calculated as sodium metasilicate pentahydrate
   C. from 5 to 10% of an alkali metal nitrite calculated as sodium nitrite
   D. from 5 to 7% of an alkali metal nitrate calculated as sodium nitrate
   E. from 0.8 to 1.5% of a compound selected from the group consisting of mercaptobenzothiazole and alkali metal salts therefor
   F. from 8 to 15% of a compound selected from the group consisting of boric acid and alkali metal borates, the latter being calculated as the tetraborate pentahydrate;

II. from 0.1 to 50% by weight, based on the weight of the solids present in I, of a polymeric dispersant which is a water-soluble carboxylic acid polymer selected from at least one member selected from the group consisting of a carboxylic acid containing vinyl addition polymer and carboxymethyl cellulose.

10. A corrosion and scale inhibitor composition for automobile and diesel coolant systems comprising an aqueous solution containing the following:

I.
   A. from 2 to 15% of an alkali metal silicate calculated as sodium metasilicate pentahydrate
   B. from 0 to 30% of an alkali metal nitrite calculated as sodium nitrite
   C. from 0 to 30% of an alkali metal nitrate calculated as sodium nitrate
   D. from 0 to 10% of a compound selected from the group consisting of mercaptobenzothiazole and alkali metal salts thereof
   E. from 15–99% of a compound selected from the group consisting of boric acid and alkali metal borates, the latter being calculated as the tetraborate pentahydrate;

II. from 0.1 to 50% by weight of a polymeric dispersant which is a water-soluble carboxylic acid polymer selected from at least one member selected from the group consisting of a carboxylic acid containing vinyl addition polymer and carboxymethyl cellulose.

11. A corrosion and scale inhibitor composition for automobile and diesel coolant systems comprising an aqueous solution containing the following:

I.
   A. from 5 to 15% of an alkali metal silicate calculated as sodium metasilicate pentahydrate
   B. from 10 to 25% of an alkali metal nitrite calculated as sodium nitrite
   C. from 10 to 25% of an alkali metal nitrate calculated as sodium nitrate
   D. from 2 to 7% of a compound selected from the group consisting of mercaptobenzothiazole and alkali metal salts thereof E. from 40 to 80% of a compound selected from the group consisting of boric acid and alkali metal borates, the latter being calculated as the tetraborate pentahydrate;

II. from 0.1 to 50% by weight of a polymeric dispersant which is a water-soluble carboxylic acid polymer selected from at least one member selected from the group consisting of a carboxylic acid containing vinyl addition polymer and carboxymethyl cellulose.

12. A corrosion and scale inhibitor composition for automobile and diesel coolant sytems comprising an aqueous solution containing the following:

I.
A. from 5 to 10% of an alkali metal silicate calculated as sodium metasilicate pentahydrate
B. from 12 to 20% of an alkali metal nitrite calculated as sodium nitrite
C. from 15 to 20% of an alkali metal nitrate calculated as sodium nitrate
D. from 2 to 5% of a compound selected from the group consisting of mercaptobenzothiazole and alkali metal salts thereof
E. from 50 to 70% of a compound selected from the group consisting of boric acid and alkali metal borates, the latter being calculated as the tetraborate pentahydrate;

II. from 0.1 to 50% by weight of a polymeric dispersant which is a water-soluble carboxylic acid polymer selected from at least one member selected from the group consisting of a carboxylic acid containing vinyl addition polymer and carboxymethyl cellulose.

13. A method of reducing and softening silicate scale formation in automobile and diesel coolant systems, which scale formation results from the introduction into such coolant systems of an alkali metal silicate for purposes of preventing the corrosion of ferrous metals, which comprises adding at least 2,000 ppm of a polymeric dispersant which is a water-soluble carboxylic acid polymer selected from at least one member of the group consisting of a carboxylic acid containing vinyl addition polymer and carboxymethyl cellulose.

14. The method according to claim 13 wherein the polymeric dispersant is a maleic anhydride copolymer.

15. The method according to claim 13 wherein the polymeric dispersant is carboxymethyl cellulose.

16. The method according to claim 1 wherein the anticorrosion formula is utilized in the coolant systems in an amount of from about 2,000 to 20,000 ppm and the polymeric dispersant is utilized in an amount of from 0.1–10 weight percent of the formula.

17. The method according to claim 13 wherein the anticorrosion formula is utilized in an amount in the coolant systems of from about 5,000–12,000 ppm and the polymeric dispersant is utilized in an amount of from 0.1–10 weight percent of the formula.

18. The method of claim 13 wherein the average molecular weight of the water-soluble carboxylic acid polymer is within the range of between 1,000 to 1,000,000.

19. The method of claim 13 wherein the average molecular weight of the water-soluble carboxylic acid polymer is within the range of between 1,000 to 100,000.

* * * * *

UNITED STATES PATENT OFFICE
CERTIFICATE OF CORRECTION

Patent No. 3,948,792                                Dated April 6, 1976

Inventor(s) Robert G. Watson and Edwin S. Troscinski

It is certified that error appears in the above-identified patent and that said Letters Patent are hereby corrected as shown below:

On the cover sheet in item "[75]" the name of inventor "Robert G. Watsen" should read -- Robert G. Watson --.

Signed and Sealed this

Twentieth Day of July 1976

[SEAL]

Attest:

RUTH C. MASON
*Attesting Officer*

C. MARSHALL DANN
*Commissioner of Patents and Trademarks*